United States Patent [19]
Suzuki

[11] Patent Number: 5,506,873
[45] Date of Patent: Apr. 9, 1996

[54] DEMODULATOR FOR A PHASE SHIFT KEYING (PSK) SIGNAL

[75] Inventor: Mitsuhiro Suzuki, Chiba, Japan

[73] Assignee: Sony Corporation, Tokyo, Japan

[21] Appl. No.: 68,326

[22] Filed: May 27, 1993

[30] Foreign Application Priority Data

May 29, 1992 [JP] Japan .................................. 4-139364
Jun. 4, 1992 [JP] Japan .................................. 4-144469

[51] Int. Cl.[6] .............................. H04L 27/22; H03D 3/22
[52] U.S. Cl. .......................................... 375/324; 375/330
[58] Field of Search ...................................... 329/304, 305, 329/306, 310; 375/324–333, 322, 279–283, 340, 354, 371–375

[56] References Cited

U.S. PATENT DOCUMENTS

| | | | |
|---|---|---|---|
| 4,435,687 | 3/1984 | Nadan et al. | 331/23 |
| 4,669,095 | 5/1987 | Hall . | |
| 5,122,758 | 6/1992 | Tomita | 375/82 |

FOREIGN PATENT DOCUMENTS 0434355  6/1991  European Pat. Off. .

OTHER PUBLICATIONS

IEEE Transactions on Communications, vol. 28, No. 8, Aug., 1989; "Digital Phase Sampling For Microcomputer Implementation of Carrier Acquisition and Coherent Tracking", by Cahn & Leimer.
Telecommunications & Radio Engineering, vol. 40/41, No. 11, Nov., 1986, "PSK Signal Processing by Microprocessor" by Mokhov.
IEEE Global Telecommunications Conference, 2–5 Dec., 1990, San Diego, U.S.; "Digital Intermediate Frequency Demodulation Technique For Cellular Communication Systems", by Tomita, Yokoyama & Matsuki.

Primary Examiner—Stephen Chin
Assistant Examiner—Hai H. Phan
Attorney, Agent, or Firm—Jerry A. Miller; Pasquale Musacchio; Robert P. Biddle

[57] ABSTRACT

A PSK signal demodulating apparatus having a clock extracting circuit. The clock extracting circuit includes a counter that is operable by a clock having a frequency N time the carrier frequency of a phase modulated signal such as a π/4 shift DQPSK modulated wave is latched at the leading edge timing of the above signal thereby to obtain phase data. Also, a difference between these phase data is calculated at mod.2π thereby to extract a clock component.

8 Claims, 9 Drawing Sheets

FIG. 7A Reference Clock

FIG. 7B Count Output of Counter 49

FIG. 7C Input Signal

FIG. 7D Output of D-FF 42

FIG. 7E Output of D-FF 43

FIG. 7F Output of Inverter Gate 47

FIG. 7G Output of and Gate 48

FIG. 7H Phase Data (Latched Output)

FIG. 11A Reference Clock

FIG. 11B Inverted Clock

FIG. 11C Output of Counter 49

FIG. 11D Input Signal

FIG. 11E Output of D-FF 42 (Even-Number)

FIG. 11F Output of D-FF 43 (Even-Number)

FIG. 11G Output of D-FF 54 (Even-Number)

FIG. 11H Phase Data (Even-Number)

FIG. 11I Quantization Width (Even-Number)

FIG. 11J Output of D-FF 42 (Odd-Number)

FIG. 11K Output of D-FF 43 (Odd-Number)

FIG. 11L Output of D-FF 54 (Odd-Number)

FIG. 11M Phase Data (Odd-Number)

FIG. 11N Quantization Width (Odd-Number)

000
DEMODULATOR FOR A PHASE SHIFT KEYING (PSK) SIGNAL

BACKGROUND OF THE INVENTION

1. Field of the Invention

The present invention relates to a demodulator for demodulating a phase-modulated signal such as a QPSK (quadrature phase shift keying) signal or the like.

2. Description of the Related Art

In communication systems such as a mobile telephone system or the like, one proposed communication system effects communication by utilizing phase-modulated digital data such as a π/4 shift DQPSK modulation (π/4 shift differential QPSK modulation) data or the like.

Figure 1:
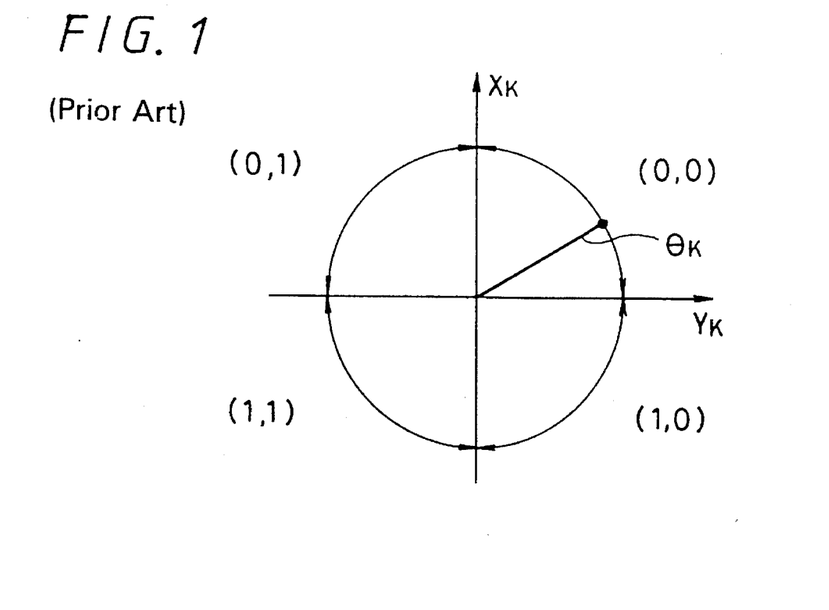
FIG. 1 shows $X_K$ and $Y_K$ vectors used for π/4 shift DQPSK modulation.

In the π/4 shift DQPSK modulation, differentiated two-series data are converted into phase information by a complex calculation and then a modulated signal is generated. As, for example, shown in FIG. 1 of the accompanying drawings, two-series data $(X_K, Y_K)$ are converted into phase data $\theta_K$ by a four-level phase converter and then transmitted. If the π/4 shift DQPSK modulation is carried out, then digital data can be transmitted efficiently. U.S. Pat. No. 5,020,076 to Stephan V. Cahill et al. describes a circuit arrangement of a π/4 shift QPSK modulator, for example.

Figure 2:
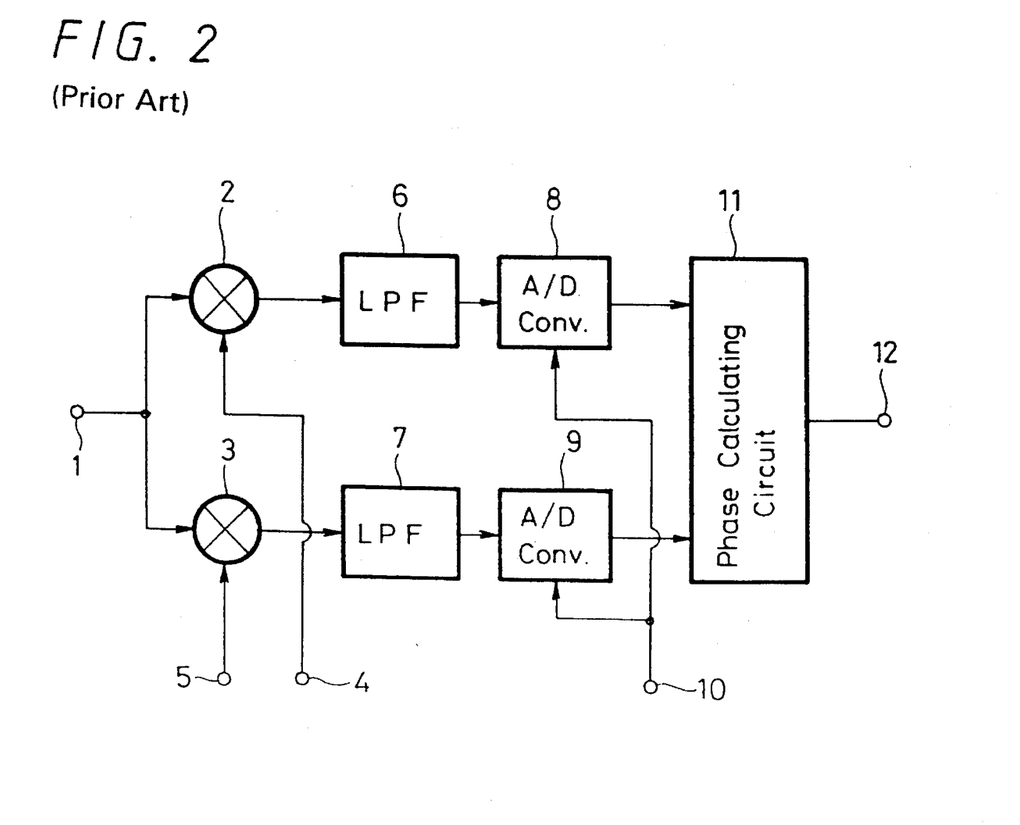
FIG. 2 is a block diagram showing a phase detecting circuit in a π/4 shift DQPSK demodulating apparatus.

FIG. 2 shows an example of a circuit arrangement of a phase detector circuit in a demodulator for demodulating a π/4 shift DQPSK modulated wave. As shown in FIG. 2, a π/4 shift DQPSK modulated signal $\cos(\omega_0 t + \theta_{(t)})$ supplied to an input terminal 1 is supplied to two mixers 2 and 3 which construct an orthogonal detector. Demodulation signals $\sin\omega_0 t$ and $\cos\omega_0 t$ applied to terminals 4 and 5 are mixed and orthogonally detected by the two mixers 2, 3, thereby generating I channel and Q channel detected signals $I_{(t)} = \cos\theta_{(t)}$ and $Q_{(t)} = \sin\theta_{(t)}$. The detected signals $I_{(t)}$ and $Q_{(t)}$ are supplied to low-pass filters (LPFs) 6 and 7, in which DC (direct current) offset amounts thereof are adjusted, respectively. Outputs of the low-pass filters 6, 7 are supplied to analog-to-digital (A/D) converters 8, 9, respectively. The A/D converters 8, 9 generate I-channel and Q-channel data $I_K$ and $Q_K$ from digital data output in response to a sampling clock supplied to a terminal 10. The I-channel and Q-channel data $I_K$ and $Q_K$ are supplied to a phase calculating circuit 11 which then supplies phase data $\theta_K$ corresponding to the I-channel and Q-channel data $I_K$ and $Q_K$ to an output terminal 12.

Figure 3:
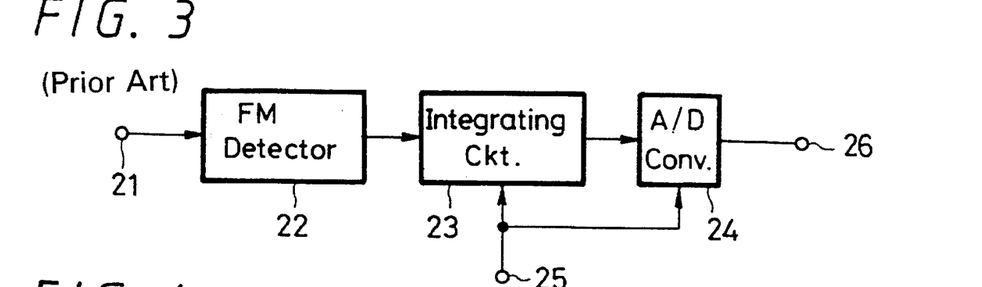
FIG. 3 is a block diagram showing a phase detecting circuit in other π/4 shift DQPSK demodulating apparatus.

FIG. 3 shows a circuit arrangement which can detect only a phase. As shown in FIG. 3, a π/4 shift DQPSK modulation signal $\cos(\omega_0 t + \theta_{(t)})$ is supplied to an FM detector 22. A detected output $d(\theta_{(t)})$ of the FM detector 22 is supplied to an integrating circuit 23. Data integrated by the integrating circuit 23 is supplied to an A/D converter 24 which derives a phase value. The same clock applied to a terminal 25 is supplied to the integrating circuit 23 and the A/D converter 24 so that the integrating circuit 23 and the A/D converter 24 are controlled at the same timing. Consequently, the A/D converter 24 supplies phase data $\theta_K$ to an output terminal 26.

Figure 4:
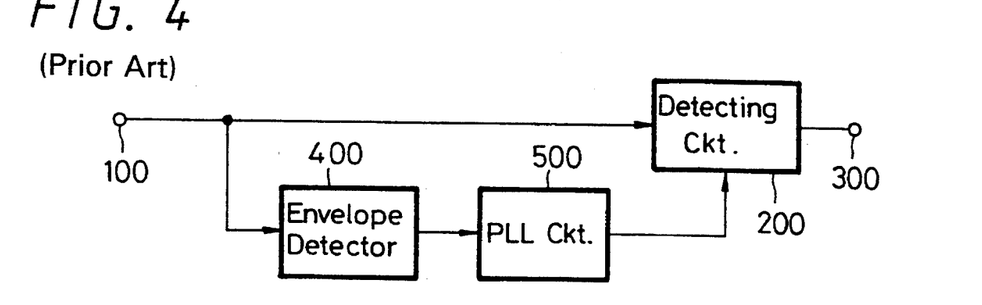
FIG. 4 is a block diagram showing a clock extracting circuit in the π/4 shift DQPSK demodulating apparatus.
Figure 5A:
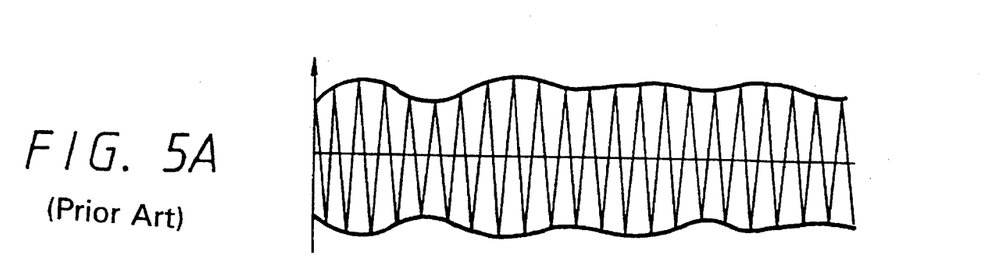
FIGS. 5A through 5C are diagrams of waveforms of signals used to extract a clock by the clock extracting circuit shown in FIG. 4, respectively.
Figures 5B, 5C:
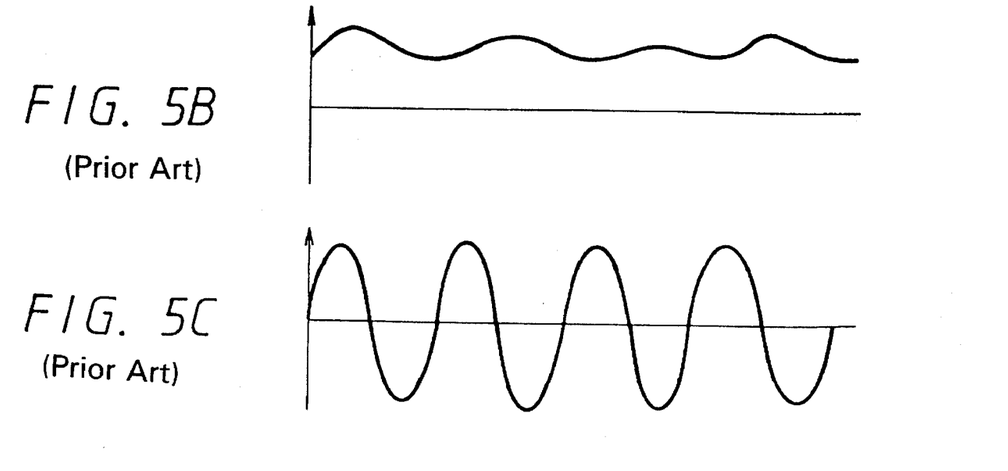

FIG. 4 shows an example of a circuit arrangement of a clock extracting circuit that constructs a demodulating apparatus for detecting a π/4 shift DQPSK modulated wave. As shown in FIG. 4, a π/4 shift DQPSK modulated signal applied to an input terminal 100 is supplied to a detecting circuit 200 such as a delay detector or the like. Data detected by the detecting circuit 200 is supplied to an output terminal 300. A modulated signal (see FIG. 5A) supplied to the input terminal 100 is supplied to an envelope detector 400 which detects an envelope of a modulated signal as shown in FIG. 5B. This envelope information is supplied to a PLL (phase-locked loop) circuit 500. The PLL circuit 500 extracts a clock component as shown in FIG. 5C. The clock component thus extracted is supplied to the detecting circuit 200 which detects the π/4 shift DQPSK modulated wave on the basis of the clock component supplied thereto. The clock component is extracted by effectively utilizing the fact that the envelope of the modulated signal is changed in response to a symbol rate of data. The PLL circuit 500 may be replaced with a band-pass filter.

OBJECTS AND SUMMARY OF THE INVENTION

It is an object of the present invention to provide a PSK signal demodulating apparatus of a simplified arrangement which can detect a phase modulated signal such as a π/4 shift DQPSK modulated wave.

It is another object of the present invention to provide a PSK signal demodulating apparatus of a simplified arrangement which can extract a clock from a phase modulated signal.

A phase detecting circuit of the PSK signal demodulating apparatus according to the present invention comprises a counter that is operable by a clock having a frequency N times the carrier frequency of an input signal, edge detecting means for detecting a leading edge of the input signal, and latch means for latching a count value of the counter by an output of the edge detecting means thereby to obtain phase data by an output of the latch means.

A PSK signal demodulating apparatus of the present invention comprises a counter that is operable by a clock having a frequency N times the carrier frequency of an input signal, edge detecting means for detecting a leading edge of the input signal and latch means for latching a count value of the counter by an output of the edge detecting means, wherein a timing of a signal output from the edge detecting means and a latch timing of the latch means are shifted at every sampling by a ½ least significant bit amount thereby to obtain phase data from the latch means.

In a clock extracting circuit of the PSK signal demodulating apparatus according to the present invention, a phase of an input phase modulated signal is detected by using a signal having a frequency N times the carrier frequency of the phase modulated signal. A difference between the phase detected signal and an immediately-preceding phase detected signal at mod.2π is detected by a subtracter. An absolute value of the difference signal thus detected is detected by an absolute value detecting circuit thereby to extract a clock component.

Furthermore, after a direct current component is eliminated from the absolute value, the clock component is extracted by judging a positive or negative polarity.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Embodiments of the present invention will hereinafter be described with reference to FIG. 6 through FIGS. 16A to 16E.

Figure 6:
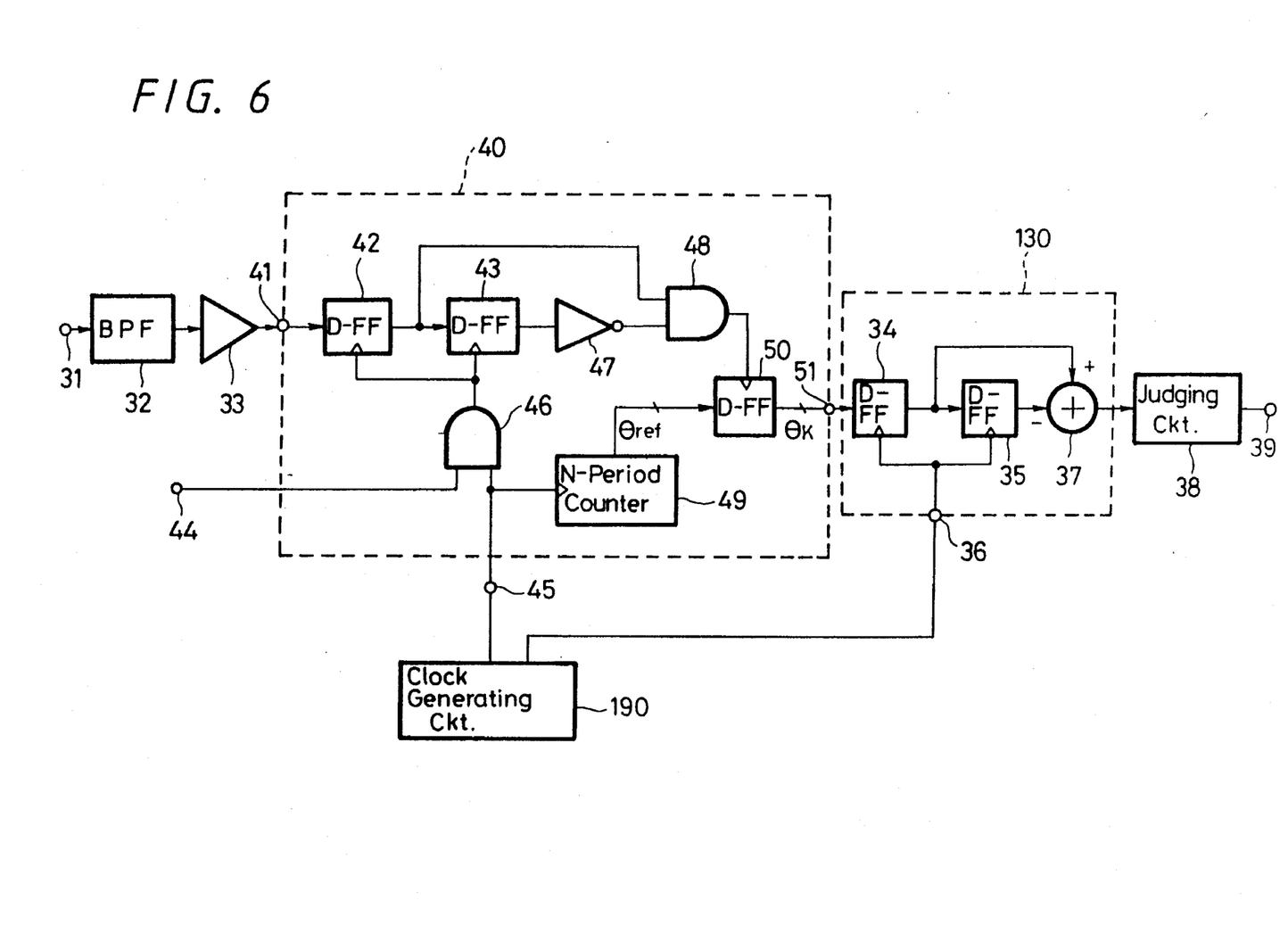
FIG. 6 is a block diagram showing a PSK demodulating apparatus according to an embodiment of the present invention.
Figure 7A:
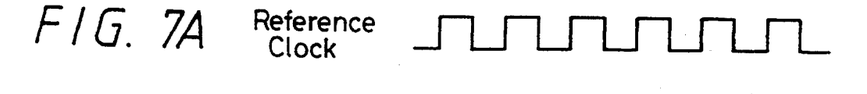
FIGS. 7A through 7H are timing charts used to explain operation of the PSK demodulating apparatus shown in FIG. 6, respectively.
Figure 7B:
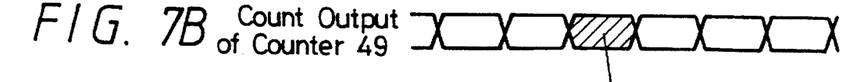
Figure 7C:
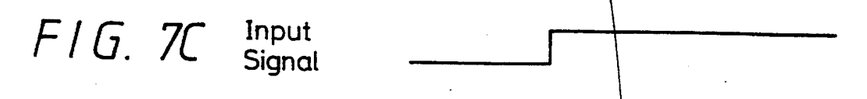
Figure 7D:
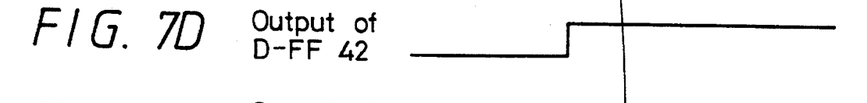
Figures 7E, 7F:
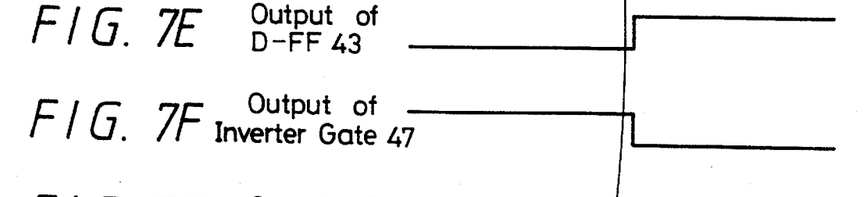
Figure 7G:
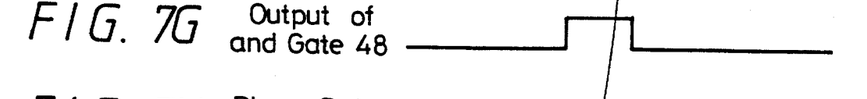
Figure 7H:
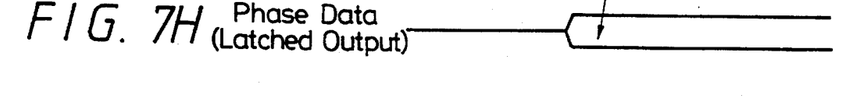

FIG. 6 shows in block form a circuit arrangement of a demodulating apparatus which demodulates π/4 shift DQPSK modulated data. A π/4 shift DQPSK modulated signal supplied to an input terminal 31 is supplied to a band-pass filter (BPF) 32, in which an unnecessary signal is eliminated and then supplied to a limiter amplifier 33. An output of the limiter amplifier 32 is supplied to a direct phase quantizer circuit 40. A circuit arrangement of the direct phase quantizer circuit 40 will be described later on.

An output of the direct phase quantizer circuit 40 is supplied to two D-type flip-flop (D-FF) circuits 34, 35 connected in series. A clock having a frequency of 21 kHz is supplied to a terminal 36 connected to the two D-type flip-flop circuits 34, 35 as a reproducing clock. An output delayed by the two D-type flip-flop circuits 34, 35 connected in series is supplied to a subtracter 37. The subtracter 37 subtracts the output of the D-type flip-flop circuit 34 from the output of the D-type flip-flop circuit 35 thereby to delay and detect the phase of the input signal. Phase data $\theta_K$ that is delayed and detected is supplied to a judging circuit 38. The judging circuit 38 judges two-series data ($X_K$, $Y_K$), which are not yet modulated, in accordance with predetermined judgement standards.

The π/4 shift DQPSK modulated data that is demodulated by the demodulating apparatus of this embodiment has a transmission rate of 42 kbps (i.e., 21 k symbols/second). The band-pass filter 32 extracts a signal of 21 kHz band.

A circuit arrangement of the direct phase quantizer circuit 40 will be described. A signal supplied to a terminal 41 from the limiter amplifier 33 is supplied to two D-type flip-flop (D-FF) circuits 42, 43 connected in series. A control signal that controls a phase detection operation and which is supplied to a terminal 44 is supplied to an AND gate 46 and a reference clock supplied to an input terminal 45 from the clock generating circuit 190 also is supplied to the AND gate 46. An AND output of the AND gate 46 is supplied to the D-type flip-flops 42, 43 as a clock. The phase detection control signal supplied to the input terminal 44 goes to high level when the phase detection is carried out. The reference clock supplied to the input terminal 45 has a frequency N times the carrier frequency of a demodulated signal. In this embodiment, N is selected to be 16.

An output of the D-type flip-flop circuit 43 is supplied through an inverter gate 47 to one input terminal of an AND gate 48. An output of the D-type flip-flop circuit 42 also is supplied to the other input terminal of the AND gate 48. An AND output from the AND gate 48 is supplied to a clock input terminal of the D-type flip-flop circuit 50.

The reference clock supplied to the input terminal 45 is supplied to an N-period counter 49 and N-period is counted by the reference clock. The reference clock is a pulse having a duty ratio of 50%. An N-period count data $\theta_{ref}$ output from the counter 49 is supplied to the D-type flip-flop circuit 50. The count data $\theta_{ref}$ is latched by the AND output of the AND gate 48. A latched output of the D-type flip-flop circuit 50 is output to a terminal 51 as the phase data $\theta_K$. Phase data output from the direct phase quantizer circuit 40 is supplied through the terminal 51 to the D-type flip-flop circuit 34.

Operation of the direct phase quantizer circuit 40 will be described with reference to timing charts forming FIGS. 7A through 7H. A count output (see FIG. 7B) of the counter 49 is changed in synchronism with the reference clock (see FIG. 7A) supplied to the input terminal 45. When the demodulated signal (see FIG. 7C) supplied to the terminal 41 goes to high level at a predetermined timing, the output (see FIG. 7D) of the D-type flip-flop circuit 42 goes to high level at the timing in which the reference clock rises after the above-mentioned demodulated signal goes to high level. Further, the output from the D-type flip-flop circuit 43 goes to high level with a delay of one clock. Then, the output from the D-type flip-flop circuit 43 is inverted by the inverter gate 47 (see FIG. 7F). An AND output of the inverted output and the output of the D-type flip-flop circuit 42 goes to high level during one clock period. The count output of the counter 49 is latched by the D-type flip-flop circuit 50 at the same timing in which the above AND output goes to high level. The count data thus latched is supplied to the terminal 51 as the phase data (see FIG. 7H).

Figure 8:
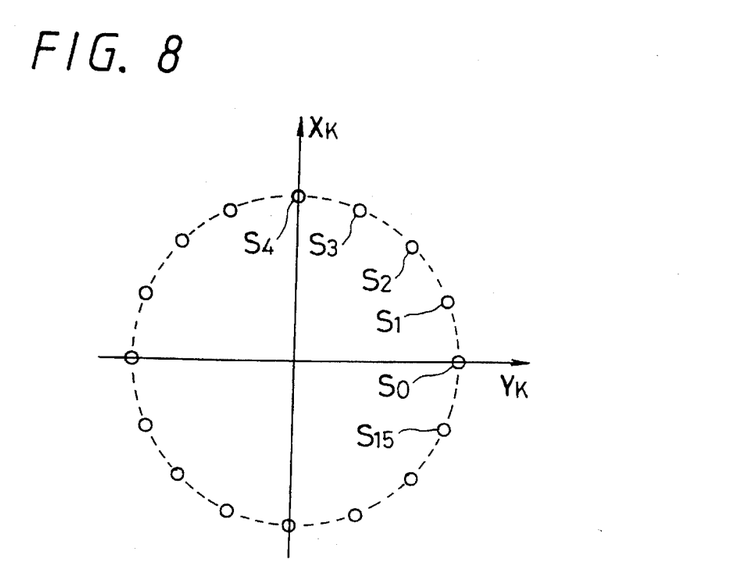
FIG. 8 is a diagram showing respective phase data by utilizing $X_K$ and $Y_K$ vectors.

In this embodiment, the phase data is detected by a reference clock 16 times the carrier frequency so that, as shown in FIG. 8, phase data, which is sampled by 16 values $S_0$ to $S_{15}$ in $2\pi$, is generated. A differential phase of the phase data is detected by the delay detecting circuit 130 which comprises the D-type flip-flop circuits 34, 35 and the subtracter 37 connected to the next stage of the direct phase quantizer circuit 40 in the form of 16 values of $D_0$ to $D_{15}$ in $2\pi$. The judging circuit 38 judges any one of four values of phase-shift amounts $\pi/4$, $-\pi/4$, $3\pi/4$ and $-3\pi/4$ determined by the $\pi/4$ shift DQPSK modulation from the differential phase values $D_0$ to $D_{15}$. Further, the judging circuit 38 judges original two-series data $(X_K, Y_K)$ on the basis of the detected phase shift amount.

Figure 10:
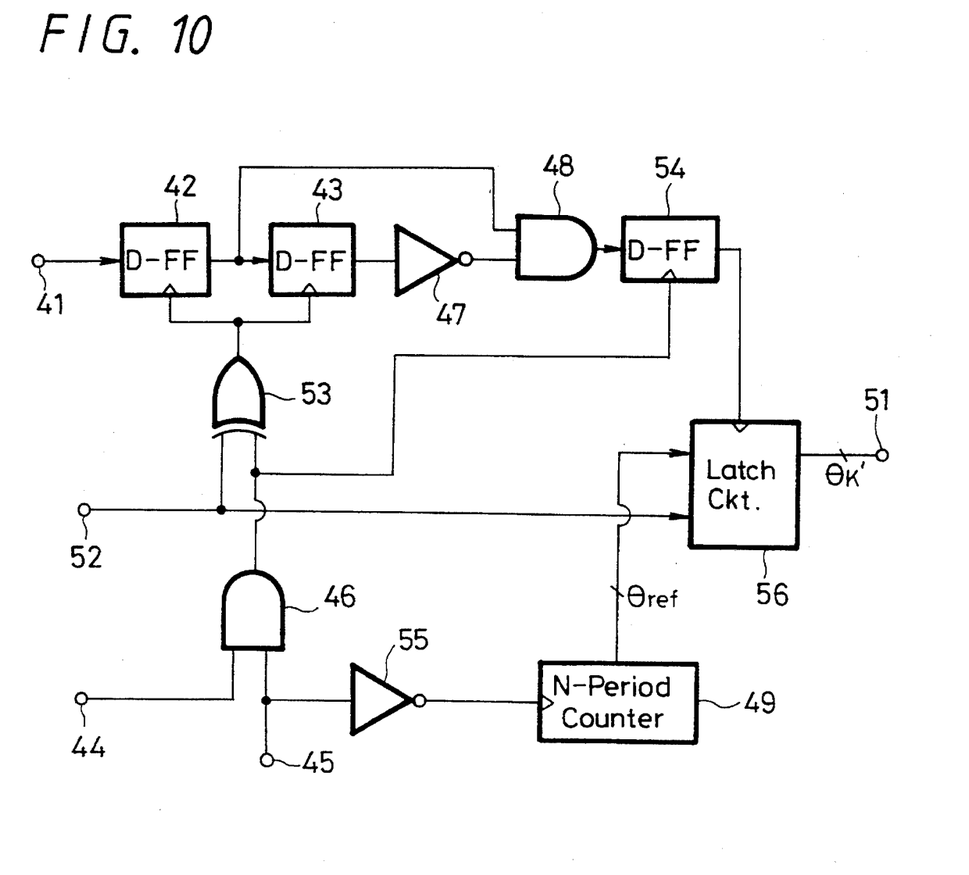
FIG. 10 is a block diagram showing a phase detecting circuit of a PSK demodulating apparatus according to another embodiment of the present invention.

The direct phase quantizer circuit 40 according to another embodiment of the present invention will be described next with reference to FIG. 10. In FIG. 10, like parts corresponding to those of FIG. 6 are marked with the same references and therefore need not be described in detail.

In FIG. 10, reference numeral 52 designates an even/odd discriminating data input terminal. The input terminal 52 is supplied with data which repeatedly goes to high level and low level at every symbol period of a demodulated signal supplied to the terminal 41. To be more concrete, this data becomes a high level signal "1" in the presence of odd-numbered symbol and becomes a low level signal "0" in the presence of even-numbered symbol. The even/odd discriminating data applied to the input terminal 52 is supplied to one input terminal of an exclusive-OR circuit 53. The exclusive-OR gate 53 is supplied at another input terminal thereof with an AND output of the phase detection control signal supplied to the input terminal 44 and the reference clock supplied to the input terminal 45. An exclusive-OR output from the exclusive-OR gate 53 is supplied to the D-type flip-flop circuits 42, 43 as a clock.

The demodulated signal supplied to the input terminal 41 is delayed by the D-type flip-flop circuits 42, 43. An output signal from the D-type flip-flop circuit 43 is inverted by the inverter gate 47 and then calculated with the output of the D-type flip-flop circuit 42 by the AND gate 48 in an AND fashion. The AND output from the AND gate 48 is supplied to the D-type flip-flop circuit 54. An AND output from the AND gate 46 is supplied to the D-type flip-flop circuit 54 as a clock. An output from the D-type flip-flop circuit 54 is supplied to a latch circuit 56 as a latch timing control clock.

The reference clock supplied to the input terminal 45 is inverted by an inverter gate 55 and then fed to the N-period counter 49. The N-period counter 49 counts the reference clock at N-period. An N-period count data output from the counter 49 is supplied to the latch circuit 56 as N-period count data θhd ref. The even/odd discriminating data supplied to the input terminal 52 also is supplied to the latch circuit 56. When the count data $\theta_{ref}$ is latched by the latch circuit 56, the even/odd discriminating data also is latched by the latch circuit 56 and thereby added to the count data $\theta_{ref}$. The even/odd discriminating data is added to the count data $\theta_{ref}$ as least significant bit (LSB). The count data $\theta_{ref}$ to which the even/odd discriminating data is added as the least significant bit is supplied to the terminal 51 as phase detection data $\theta_K'$. The phase data supplied to the terminal 51 is supplied to the D-type flip-flop circuit 34 in FIG. 6 as the output of the direct phase quantizer circuit 40.

Figure 11A:
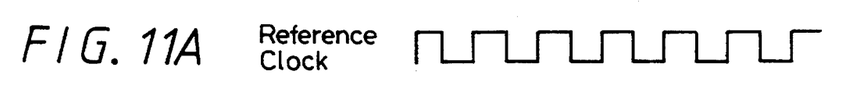
FIGS. 11A to 11N are timing charts used to explain operation of the phase detecting circuit shown in FIG. 10, respectively.
Figure 11B:
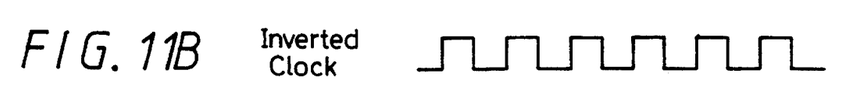
Figure 11C:
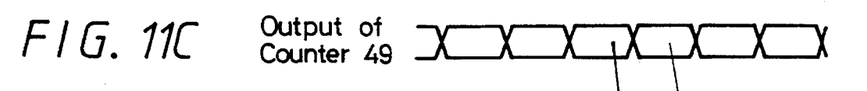

Operation of the direct phase quantizer circuit 40 shown in FIG. 10 will be described with reference to FIGS. 11A through 11N forming timing charts. A reference clock shown in FIG. 11A is supplied to the input terminal 45. The inverter gate 55 and the exclusive-OR gate 53 derive an inverted clock shown in FIG. 11B under the condition that the symbol is the odd-numbered symbol. The count output (see FIG. 11C) from the counter 49 is changed in synchronism with the inverted clock.

Figure 11D:
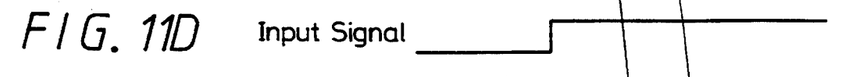
Figure 11E:
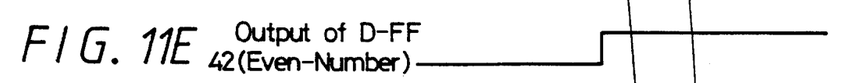
Figure 11F:
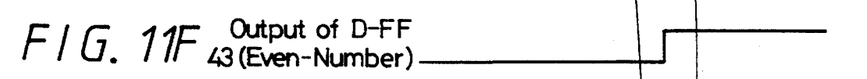
Figure 11G:
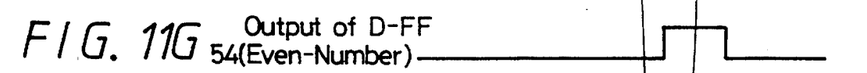
Figure 11H:
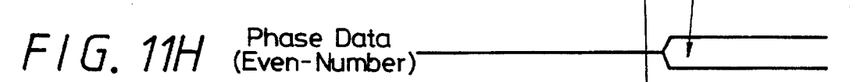
Figure 11I:
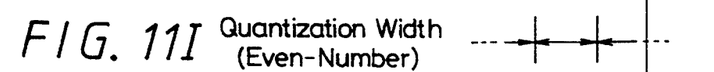

A description will be made on a phase detection that is carried out when the demodulated signal, which changes to high level at a predetermined timing as shown in FIG. 11D, is supplied to the input terminal 41 under this condition. At a receiving timing of even-numbered symbol, the reference clock is supplied to the D-type flip-flop circuits 42, 43 as it is. Accordingly, the output (see FIG. 11E) of the D-type flip-flop circuit 42 is changed at the leading edge timing of the reference clock. The output (see FIG. 11F) of the D-type flip-flop circuit 53 is changed with a delay of one clock period. The AND gate 48 calculates the outputs of the D-type flip-flop circuits 42, 43 in an AND fashion. The output of the AND gate 48 is delayed by one clock by the D-type flip-flop circuit 54 (see FIG. 11G) and the count data $\theta_{ref}$ and the even/odd discriminating data are latched by the latch circuit 56. The data thus latched by the latch circuit 56 is output to the output terminal 51 as the phase detection data $\theta_K'$ as shown in FIG. 11H. At the receiving timing of even-numbered symbol, a quantization width of the input signal is determined by the leading edge timing of the reference clock as shown in FIG. 11I.

Figure 11J:
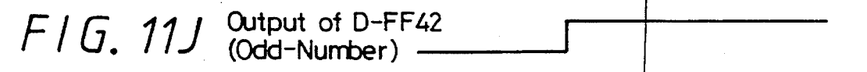
Figure 11K:
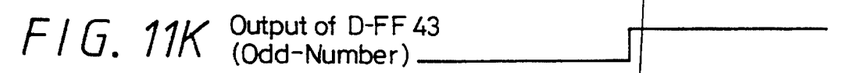
Figure 11L:
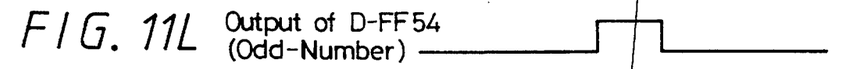
Figure 11M:
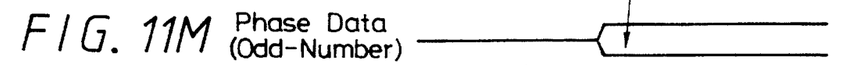
Figure 11N:
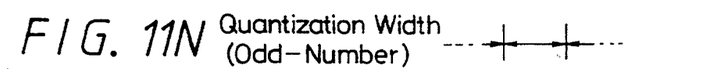

At the receiving timing of the odd-numbered symbol, the inverted clock is supplied to the D-type flip-flop circuits 42, 43 as it is. The output (see FIG. 11J) of the D-type flip-flop circuit 42 is changed at the leading edge timing of the inverted clock. The output of the D-type flip-flop circuit 42 is delayed by one clock period by the D-type flip-flop circuit 43 (see FIG. 11K). Then, the AND output of the outputs of the D-type flip-flop circuits 42, 43 from the AND gate 48 is delayed by a 0.5 clock by the D-type flip-flop circuit 54 (see FIG. 11L). The latch circuit 54 latches the count data $\theta_{ref}$ and the even/odd discriminating data. The data thus latched by the latch circuit 54 is output to the output terminal 51 as the phase detected data $\theta_K'$ (see FIG. 11M). At the receiving timing of the odd-numbered symbol, the quantization width of the input signal is determined by the leading edge timing of the inverted clock as shown in FIG. 11N.

Figure 9:
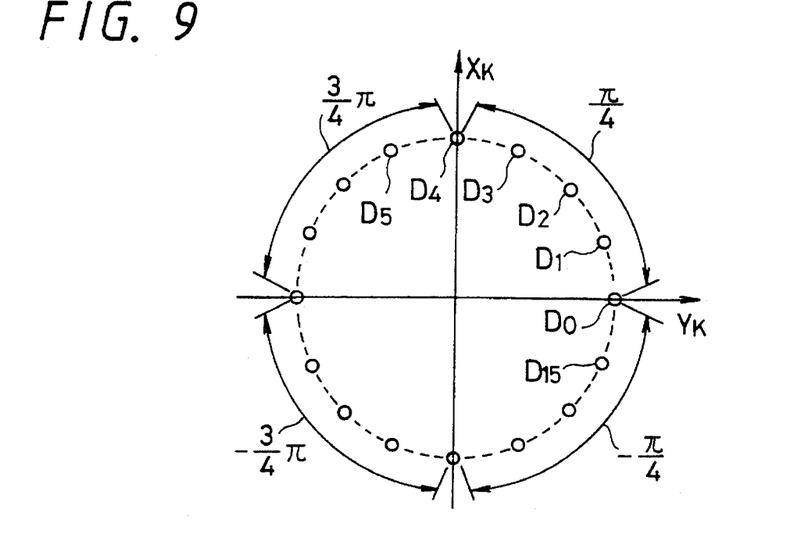
FIG. 9 is a diagram showing respective differential phase data by utilizing $X_K$ and $Y_K$ vectors.
Figure 12:
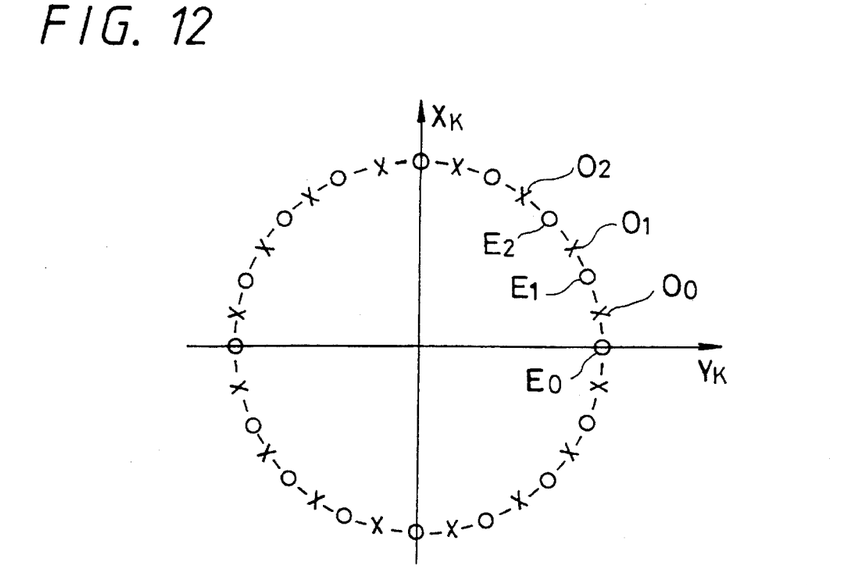
FIG. 12 is a diagram showing respective phase data in the PSK signal demodulating apparatus shown in FIG. 10 in the form of $X_K$ and $Y_K$ vectors.
Figure 13:
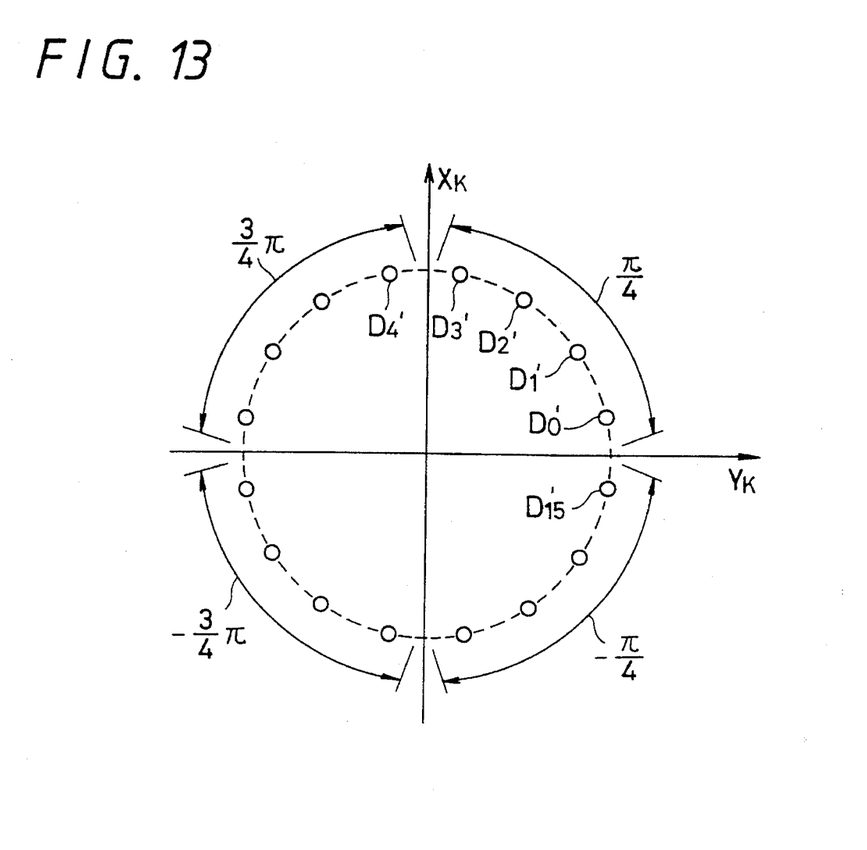
FIG. 13 is a diagram showing a differential phase in FIG. 12 in the form of $X_K$ and $Y_K$ vectors.

The phase data thus detected is detected by the reference clock 16 times the symbol clock so that it becomes data that is sampled by 16 values in $2\pi$. Since the phase of the clock is inverted by 180° when the even-numbered symbol is detected or when the odd-numbered symbol is detected, a detection phase is inverted in sampling data $E_0$ to $E_{15}$ (shown by open circles in FIG. 12) of the odd-numbered symbol and sampling data $O_0$ to $O_{15}$ (shown by times in FIG. 12) of the odd-numbered symbol. Therefore, the delay detecting circuit 130 that comprises the D-type flip-flop circuits 34, 35 and the subtracter 37 connected to the next stage of the direct phase quantizer circuit 40 detects the differential phase of the detected phase data by 16 values of $D_0'$ to $D_{15}'$ in $2\pi$ as shown in FIG. 13. The differential phase detected at this time is shifted in phase by $\pi/16$ as compared with the differential phase in FIG. 9 so that the phase shift amounts $\pi/4$, $-\pi/4$, $3\pi/4$ and $-3\pi/4$ and $-3\pi/4$ of four values can be precisely detected from differential phase values at respective points in FIG. 13. That is, in the embodiment shown in FIG. 13, the differential phase sampling values do not exist at boundaries of the respective phase shift amounts $\pi/4$, $-\pi/4$, $3\pi/4$ and $-\pi/4$ and respective sampling values $D_0'$ to $D_{15}'$ correspond to any phase shift amounts in a one-to-one relation. By way of example, the sampling values $D_0'$ $D_1'$, $D_2'$ and $D_3'$ become phase shift amount $\pi/4$. Then, the original two-series data $(X_K, Y_K)$ are judged on the basis of the detected phase shift amount.

Since the phase is quantized as described above, similarly to the first embodiment, the phase data can be detected by the circuit of simplified circuit arrangement. Also, since the precise phase shift amount can be detected from the quantized phase data, error in the detected phase can be reduced and bit error rate can be reduced.

While the present invention is applied to the demodulating apparatus which demodulates the π/4 shift DQPSK modulated digital data as described above, the present invention is not limited thereto and may be applied to a circuit which detects phase data from other phase-modulated digital data.

Figure 14:
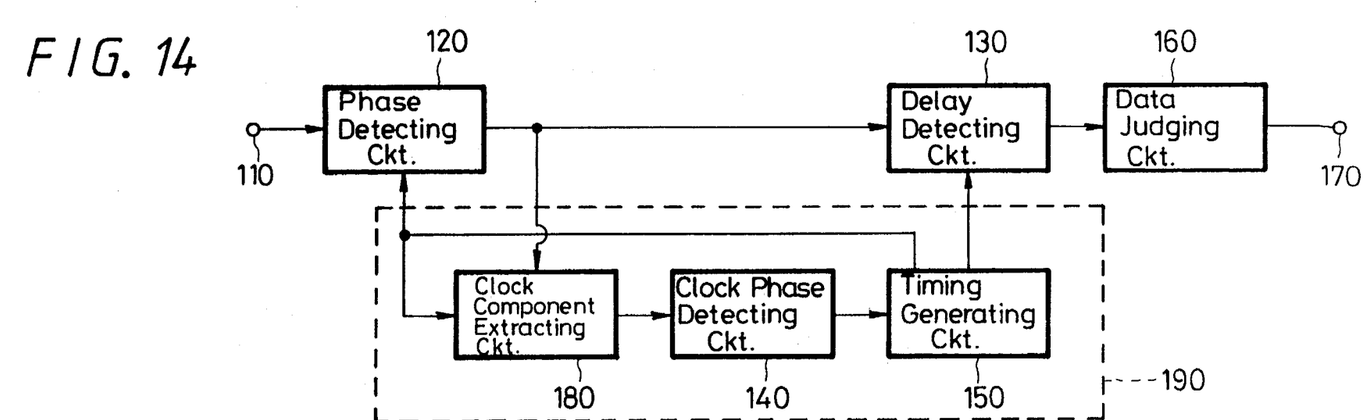
FIG. 14 is a block diagram showing a π/4 shift DQPSK demodulating apparatus to which the present invention is applied.

FIG. 14 shows a clock extracting circuit that constructs the demodulating apparatus for demodulating π/4 shift DQPSK modulated data.

As shown in FIG. 14, π/4 shift DQPSK modulated signal supplied to an input terminal 110 is supplied to a phase detecting circuit 120 shown in FIG. 6 or 10. The phase detecting circuit 120 detects four-phase phase informations $\theta_{K0}$, $\theta_{K1}$, $\theta_{K2}$ an $\theta_{K3}$ in synchronism with a timing signal having a frequency four times the carrier frequency of the PSK modulated signal supplied from a timing generating circuit 150 which will be described later on. The phase information thus detected is supplied to the delay detecting circuit 130 which comprises the D-type flip-flop circuits 34, 35 and the subtracter 37 shown in FIG. 6. The delay detecting circuit 130 detects a difference $\Delta\theta_K$ between the phase information of the present timing point and a phase information of the immediately-preceding sampling point. The delay detection is carried out in synchronism with a timing signal supplied from the timing generating circuit 150. The difference information $\Delta\theta_K$ detected by the delay detecting circuit 130 is supplied to a data judging circuit 160, in which it is demodulated to provide the two-series data $(X_K, Y_K)$. The data $(X_K, Y_K)$ are output to a terminal 170.

The phase information output from the phase detecting circuit 120 is supplied to a clock component extracting circuit 180. The clock component extracting circuit 180 extracts a clock component in synchronism with a timing signal having a frequency four times the carrier frequency supplied from the timing generating circuit 150. A circuit arrangement of the clock extracting circuit 180 will be described more fully later on. A clock output from the clock component extracting circuit 180 is supplied to a clock phase detecting circuit 140 which calculates an average value of phases over several clock periods. By this average processing, the clock component extracting circuit 180 is made difficult to be affected by a temporary disorder of clock. A clock information output from the clock phase detecting circuit 140 is supplied to the timing generating circuit 150 which then generates a timing signal. The timing signal is supplied to the phase detecting circuit 120, the delay detecting circuit 130 and the clock component extracting circuit 180. The timing signal, which is supplied to the phase detecting circuit 120 and the clock component extracting circuit 180, has a frequency four times the carrier frequency.

Figure 15:
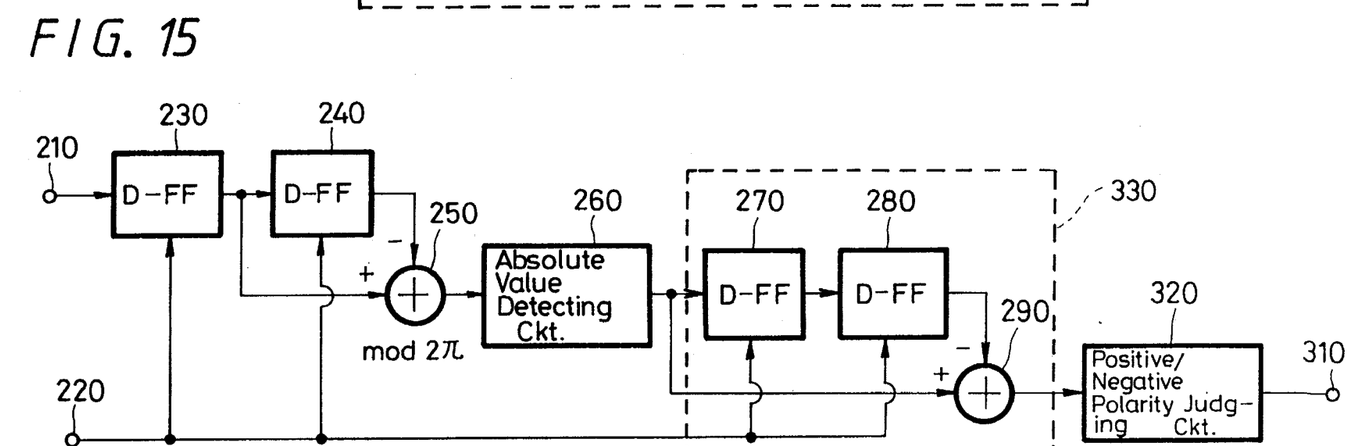
FIG. 15 is a block diagram showing a clock component extracting circuit shown in FIG. 14.

A circuit arrangement of the clock component extracting circuit 180 will be described with reference to FIG. 15. As shown in FIG. 15, a phase information supplied to a phase information input terminal 210 from the phase detecting circuit 120 is supplied to two D-type flip-flop (D-FF) circuits 230, 240 connected in series. The timing signal having the frequency four times the carrier frequency supplied to a timing signal input terminal 220 is supplied to clock input terminals of the D-type flip-flop circuits 230, 240. The phase information is delayed by one period amount of the timing signal (i.e., ¼ clock amount) by the D-type flip-flop circuit 230 and is further delayed by one period amount by the D-type flip-flop circuit 240. Therefore, the output from the D-type flip-flop circuit 240 is delayed by ½ clock amount relative to the input phase information.

The outputs from the D-type flip-flop circuits 230, 240 are supplied to a subtracter 250, in which the ½-clock delayed output of the D-type flip-flop circuit 240 is subtracted from the ¼-clock delayed output of the D-type flip-flop circuit 230. The subtraction processing for calculating a difference in mod. 2π, i.e., a subtraction processing that calculates a difference of mod.2π is effected between +π and −π about 0.

A subtracted output from the subtracter 250 is supplied to an absolute value detecting circuit 260. The absolute value detecting circuit 260 detects an absolute value of the subtracted output. The detected absolute value information is supplied to two D-type flip-flop (D-FF) circuits 270, 280 connected in series. The timing signal having the frequency four times the carrier frequency supplied to the timing signal input terminal 220 is supplied to clock input terminals of the D-type flip-flop circuits 270, 280, in which it is delayed by ¼-period each. The output of the absolute value detecting circuit 260 and the output from the D-type flip-flop circuit 280 are supplied to a subtracter 290 which subtracts the output of the D-type flip-flop circuit 280 from the output of the absolute value detecting circuit 260. A subtracted output from the subtracter 280 is supplied to a positive/negative polarity judging circuit 320, in which it is judged in polarity and then converted into binary data. The binary data from the judging circuit 320 is supplied to a clock component output terminal 310. Data developed at the clock component output terminal 310 is supplied to the clock phase detecting circuit 140 as the output from the clock component extracting circuit 180 shown in FIG. 14.

Operation of the clock component extracting circuit 180 will be described with reference to FIGS. 16A through 16E. Assuming now that a phase information of the π/4 shift DQPSK modulated data detected by the phase detecting circuit 120 is a signal shown in FIG. 16A, then the signal is sampled at positions shown by open or solid circles in FIG. 16A because this phase information is the signal that is sampled by the timing signal having the frequency four times the carrier frequency. Further, there exists a sampling point (shown by the solid circle in FIG. 16A) near the symbol clock at the ratio of one sampling point per four periods.

This phase information undergoes the subtraction processing in which a difference at mod.2π is calculated. Study of the change of phase information shown in FIG. 16A reveals that the change of phase information is small in an interval a near the sampling point and that the change of phase is comparatively large in an interval b which is distant from the sampling point. When the subtraction processing is carried out by the subtracter 250, then the data is changed as shown in FIG. 16B.

Figure 16A:
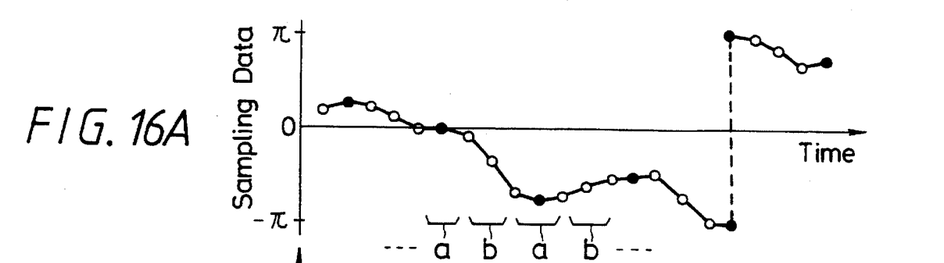
FIGS. 16A through 16E are diagrams used to explain operation of the clock component extracting circuit shown in FIG. 15, respectively.
Figure 16B:
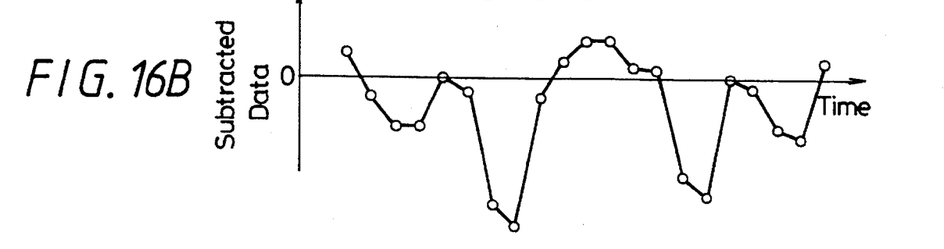
Figures 16C, 16D:
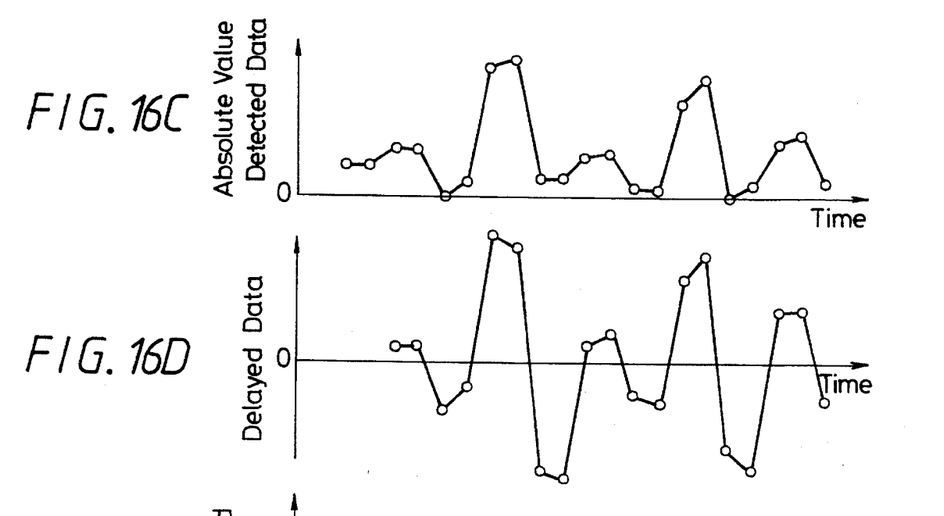
Figure 16E:
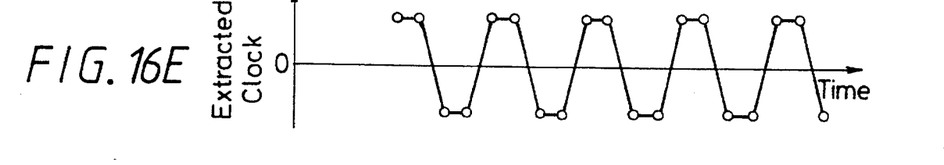

When an absolute value of the signal shown in FIG. 16B is detected by the absolute value detecting circuit 260, there is obtained data whose value is changed at every cycle of the carrier frequency as shown in FIG. 16C. A direct current eliminating circuit 330 subtracts the output of the absolute value detecting circuit 260 and the delay signal so that the subtracter 290 derives data from which a DC component is eliminated and whose value is changed with respect to 0 level as shown in FIG. 16D. This data is judged in polarity by the positive/negative polarity judging circuit 320 and converted into binary data, thereby data of symbol clock period shown in FIG. 16E being obtained.

According to the aforesaid embodiment, after the DC component is eliminated from the absolute value detected by the absolute value detecting circuit 260, this data is judged in polarity by the positive/negative polarity judging circuit

320 thereby to extract the clock component. However, since the precise clock component is included in the absolute value detection data from the absolute value detecting circuit 260, the direct current eliminating circuit 330 is not always required.

While the present invention is applied to the demodulating apparatus that demodulates the π/4 shift DQPSK modulated digital data as described above, the present invention is not limited thereto and a clock component may be extracted from other phase-modulated digital data.

Having described preferred embodiments of the invention with reference to the accompanying drawings, it is to be understood that the invention is not limited thereto and that various changes and modifications could be effected therein by one skilled in the art without departing from the spirit or scope of the invention as defined in the appended claims.

What is claimed is:

1. A PSK (phase shift keying) signal demodulating apparatus for demodulating a PSK modulated signal comprising:
   (a) a clock generating circuit for generating a reference clock having a frequency N times the carrier frequency of said PSK modulated signal;
   (b) an N-period counter supplied with said reference clock output from said clock generating circuit;
   (c) an edge detecting circuit for detecting an edge of a waveform of said PSK modulated signal;
   (d) a latch circuit for latching count data of said N-period counter by an output signal of said edge detecting circuit to generate phase data;
   (e) a differential phase detecting circuit for generating differential data of the phase data output from said latch circuit; and
   (f) a data judging circuit for judging a phase shift amount from the differential data output from said differential phase detecting circuit thereby to generate a nonmodulated signal; wherein
   (g) said clock generating circuit includes a clock component extracting circuit, a clock phase detecting circuit and a timing generating circuit for forming a timing signal supplied to said differential phase detecting circuit and said clock component extracting circuit, and wherein said clock component extracting circuit extracts a clock component in synchronism with a timing signal having a frequency four times the carrier frequency supplied from said timing generating circuit and said clock phase detecting circuit calculates an average value of phases to form a clock information output signal which is supplied to said timing generating circuit for forming said timing signal.

2. The PSK signal demodulating apparatus according to claim 1, wherein said edge detecting circuit comprises first and second flip-flops connected in series and said edge detecting circuit delays said PSK modulated signal in response to said reference clock and detects an edge of said PSK modulated signal on the basis of a logical calculation of outputs of said first and second flip-flops.

3. The PSK signal demodulating apparatus according to claim 1, wherein said differential phase detecting circuit comprises third and fourth flip-flops connected in series and said differential phase detecting circuit delays phase data output from said latch circuit in response to said reference clock and generates a differential phase from a difference of outputs of said third and fourth flip-flops.

4. The PSK signal demodulating apparatus according to claim 1, wherein said clock component extracting circuit comprises fifth and sixth flip-flops connected in series which are supplied with said PSK modulated signal for delaying said PSK modulated signal in response to a predetermined timing signal and a first subtracting circuit for subtracting outputs of said fifth and sixth flip-flops at mod.2π to provide a first subtracting circuit output signal, wherein said reference clock is generated by using said first subtracting circuit output signal.

5. The PSK signal demodulating apparatus according to claim 1, wherein said clock component extracting circuit comprises:
   fifth and sixth flip-flops connected in series which are supplied with said PSK modulated signal for delaying said PSK modulated signal in response to a first predetermined timing signal and a first subtracting circuit for subtracting outputs of said fifth and sixth flip-flops at mod.2π to provide a first subtracting circuit output signal;
   an absolute value detecting circuit for detecting the absolute value of the first subtracting circuit output signal and for forming an absolute value signal;
   seventh and eighth flip flops connected in series which are supplied with said absolute value signal, wherein said predetermined timing signal is supplied to said seventh and eighth flip flops and said predetermined timing signal is delayed by the seventh and eighth flip flops; and
   a second subtracting circuit for subtracting an output from said eighth flip flop from said absolute value signal to form a second subtracting circuit output signal, wherein said reference clock is generated by using said second subtracting circuit output signal.

6. A PSK (phase shift keying) signal demodulating apparatus for demodulating a PSK modulated signal comprising:
   (a) a clock generating circuit for generating a reference clock having a frequency N times the carrier frequency of said PSK modulated signal;
   (b) an N-period counter supplied with said reference clock output from said clock generating circuit;
   (c) an edge detecting circuit for detecting an edge of a waveform of said PSK modulated signal;
   (d) a latch circuit for latching count data of said N-period counter and even/odd discriminating data whose logical value is changed at every symbol period of said PSK modulated signal by the output signal of said edge detecting circuit, and for adding said even/odd discriminating data to said count data latched thereby to generate phase data;
   (e) a differential phase detecting circuit for generating differential data of the phase data output from said latch circuit;
   (f) a data judging circuit for judging a phase shift amount from the differential data output from said differential phase detecting circuit thereby to generate a nonmodulated signal;
   (g) wherein said clock generating circuit comprises fifth and sixth flip-flops connected in series which are supplied with said PSK modulated signal for delaying said PSK modulated signal in response to a predetermined timing signal and a first subtracting circuit for subtracting outputs of said first and second flip-flops at mod.2π to provide a first subtracting circuit output signal, and
   (h) wherein said reference clock is generated by using said first subtracting circuit output signal.

7. The PSK signal demodulating apparatus according to claim 6, wherein said clock generating circuit further comprises an absolute value detecting circuit for detecting an absolute value of said first subtracting circuit output signal and wherein said reference clock is generated by using output of said absolute value detecting circuit.

8. The PSK signal demodulating apparatus according to claim 7, said clock generating circuit further comprises seventh and eighth flip-flops connected in series for delaying a signal output from said absolute value detecting circuit in response to said predetermined timing signal and a second subtracting circuit for calculating a difference between outputs of said absolute value detecting circle and said eighth flip-flop wherein said reference clock is generated by using output of said second subtracting circuit.

* * * * *